June 12, 1962  G. LESSMAN  3,038,372
LANTERN SLIDE ILLUMINATING SYSTEM
Filed March 21, 1958  5 Sheets-Sheet 1
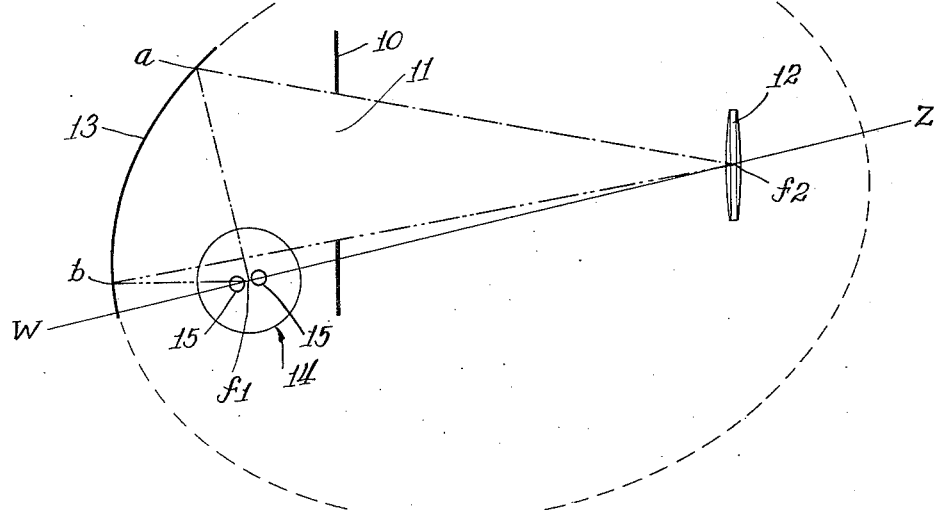
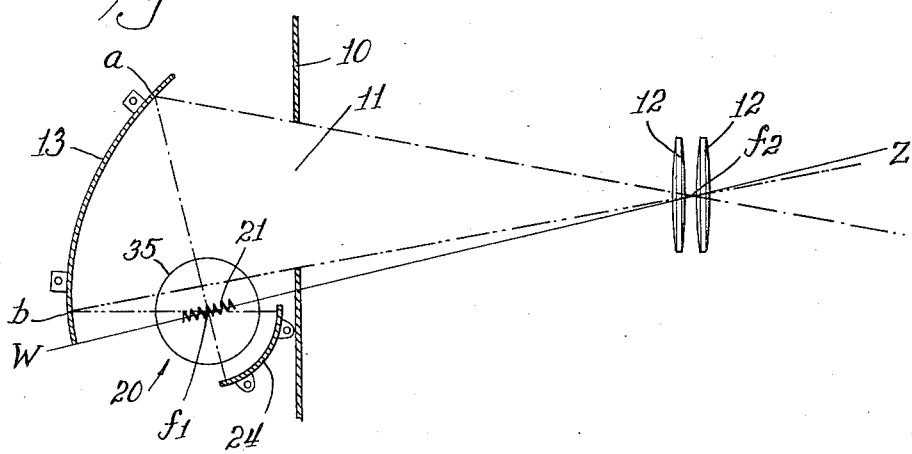
INVENTOR.
Gerhard Lessman
BY
Robert F. Miehle, Jr.
Att'y.

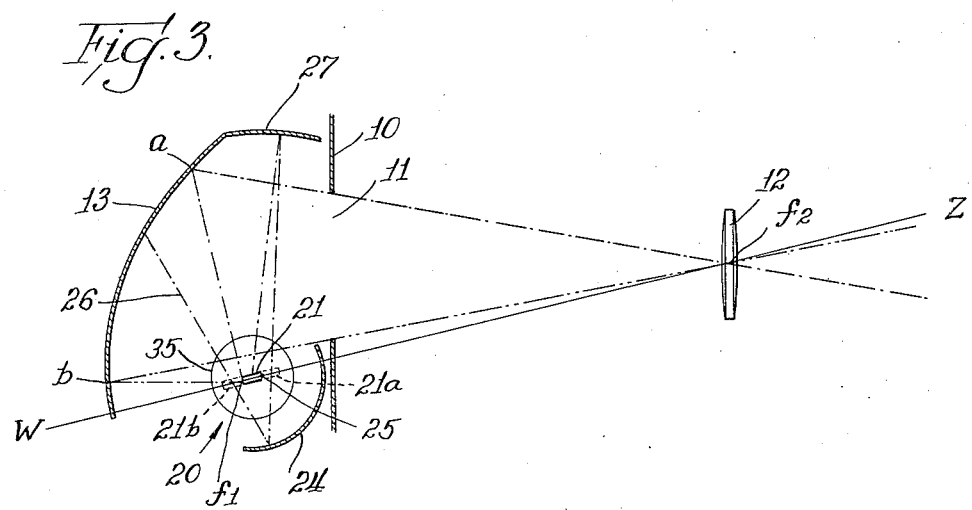
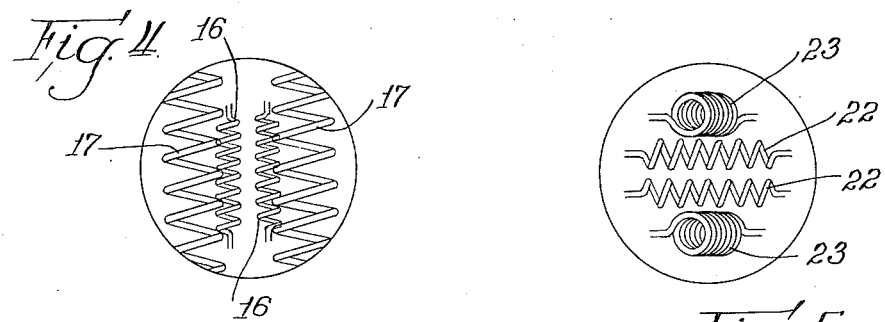
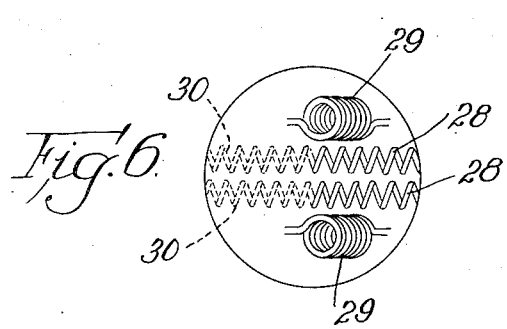

June 12, 1962    G. LESSMAN    3,038,372
LANTERN SLIDE ILLUMINATING SYSTEM
Filed March 21, 1958    5 Sheets-Sheet 3
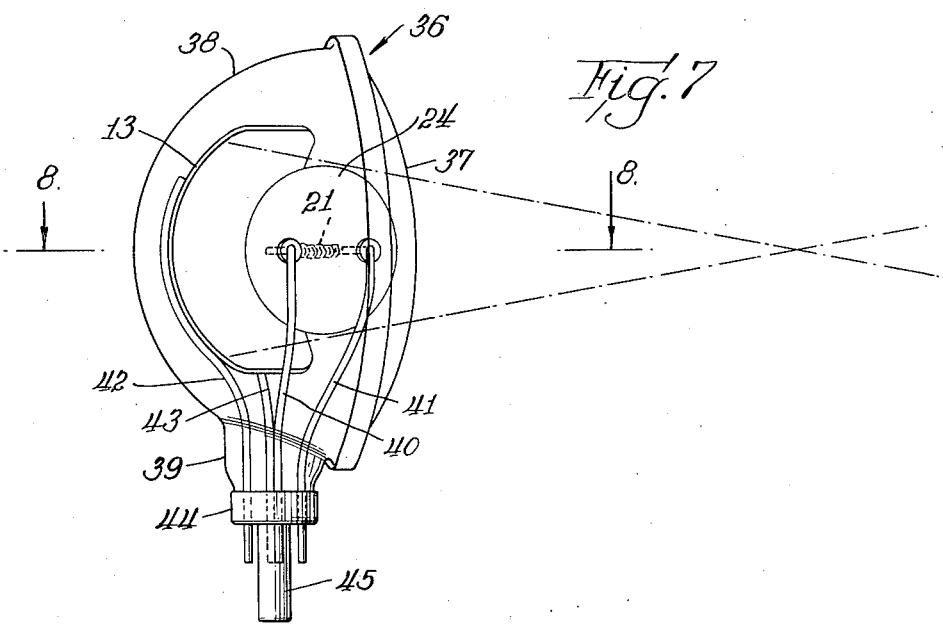
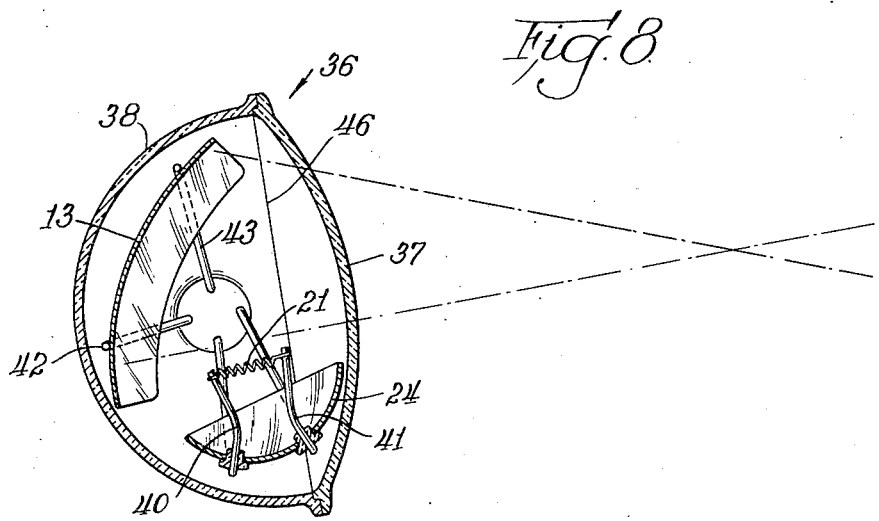
INVENTOR.
Gerhard Lessman
BY
Robert F. Miehle, Jr.
Att'y

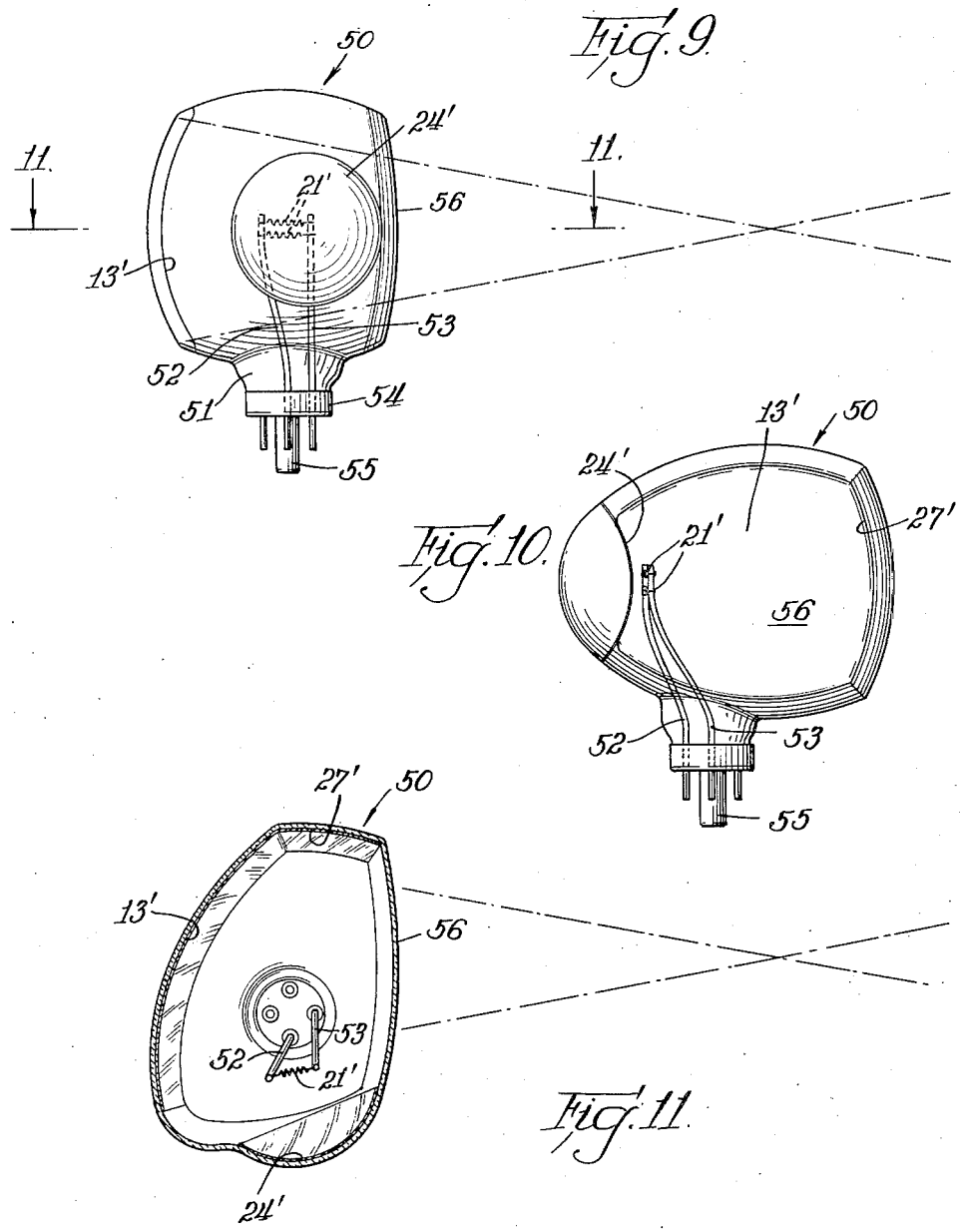

June 12, 1962 G. LESSMAN 3,038,372
LANTERN SLIDE ILLUMINATING SYSTEM
Filed March 21, 1958 5 Sheets-Sheet 5
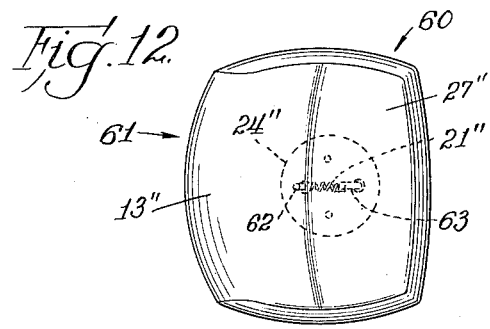
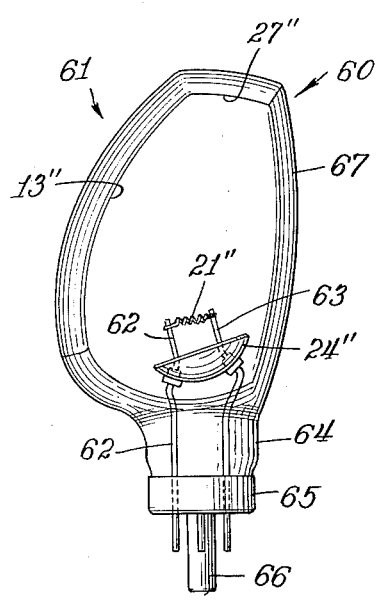 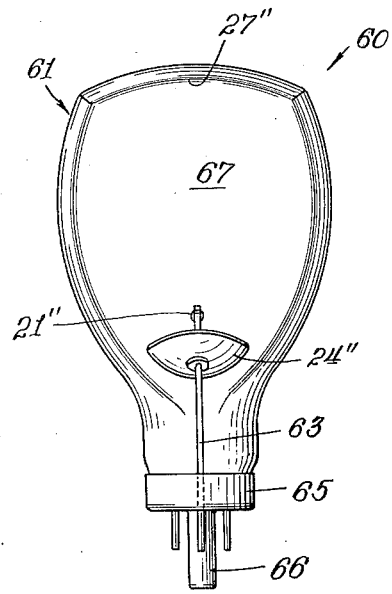
INVENTOR.
Gerhard Lessman
BY
Robert F. Miehle
Att'y United States Patent Office 3,038,372
Patented June 12, 1962

3,038,372
LANTERN SLIDE ILLUMINATING SYSTEM
Gerhard Lessman, Rutland Township, Kane County, Ill., assignor to Bell & Howell Company, Chicago, Ill., a corporation of Illinois
Filed Mar. 21, 1958, Ser. No. 723,017
31 Claims. (Cl. 88—24)

My invention relates to optical illuminating systems for slide projectors or similar projection systems of the class known as lantern slide projection systems, as distinguished from motion picture projection systems.

A lantern slide projection system is one forming an optical image of the light source upon the entrance pupil of the projection lens. In the lantern slide plane which is also the focal plane of the projection lens, the cross section of the cone of light from the optical system must be as uniformly illuminated and as bright as possible.

The basic problem in the design of lantern slide projection systems is to provide sufficient illumination at acceptable uniformity. This is generally understood to imply that the brightness of illumination of the corners of the projected image shall be not less than 66% or even 70% of the brightness of the center of the image, and that no objectionable color or shadow bands, lamp coil images, etc., be apparent.

Hitherto, it has been customary to employ glass condenser lenses in lantern slide illuminating systems. These varied in number from two to as many as five. An additional spherical reflector also is disposed behind the lamp to recover the rearwardly emitted light flux. This conventional arrangement although convenient, is rather expensive because of the cost of the glass and of the mountings therefor. The size and cost of the glass increases rapidly as increases in lantern slides are contemplated. Because of the relative inefficiency of this system, a high wattage light source is required. To dissipate the excessive heat, a blower is employed, thus increasing the cost and complexity of the system.

It has been proposed that a reflector illuminated lantern slide system could be designed, which would dispense with the usual glass condensers, employing only a single ellipsoidally shaped reflector having two conjugate foci one of which would be at the light source and the other at or in the projection lens. Analogous systems have been successfully demonstrated for motion picture projection, in which the second focus is at the film aperture.

Extending this analogy, it has been proposed further that, similar to certain recently disclosed integral beam motion picture projection lamps which contain both a reflector and a light source within a common glass envelope, a lantern slide projector lamp might be evolved on a similar basis. Until my own researches into this subject culminated in the invention described herein, such proposals came to naught, because no one had suggested how either the light source or the glass lamp envelope might be kept from being imaged on the screen. In any such axially centered system employing an external reflector and a lamp at the first focus thereof, the lamp bulb casts a shadow in the light of the beam projected from the elliptical reflector into the projection lens. The light source, usually a coil of tungsten wire, will appear as an out of focus hot-spot on the screen, in either type of systems. Both conditions are undesirable. There have been a few attempts to place the light source outside the field of view of the projection lens. For example, a large so-called overhead projector has been demonstrated in which an off-axis elliptical reflector is utilized in conjunction with a standard bi-plane projection lamp located outside the field of view of the projection lens, at a large angle to the major axis of the system. This system had extremely poor illumination uniformity, the illumination varying from one edge of the projected image to the other edge by a factor of six, a quite unsatisfactory condition. In none of the proposals or disclosures of the prior art is shown a recognition of the relationship between proper orientation and configuration of the light source and the optical characteristics of the system to achieve acceptable uniformity.

One of the chief objects of my invention therefore is to provide a reflective illuminating system for lantern slide projectors having a high illumination of acceptable uniformity.

Another object of my invention is to provide an off-axis ellipsoidal reflector illuminating system for lantern slide projectors having the advantage of the light source out of the field of view of the projection lens.

Another object of my invention is to provide a reflector illuminating system for lantern slide projectors functionally related to the characteristics of the light source thus to realize a more advantageous light distribution.

Another object of my invention is to provide a reflector illuminating system for slide projectors employing modified reflectors capable of utilizing light flux from the source that has not hitherto been taken advantage of.

Another object of my invention is to combine the objectives and advantages listed above with those of an integral beam construction, in which the several elements of my novel reflective lantern slide projection system are enclosed within a common lamp bulb or envelope.

Another object of my invention is to provide an integral beam slide projector lamp including the various objects and advantages listed above, in which the several reflectors alluded to above are integral with the lamp bulb, portions of which are formed to the appropriate contour.

Still another object of my invention is to increase the efficiency of the system, thereby reducing the amount of heat that must be dissipated and avoiding the necessity for using means, such as a blower, to remove the excess heat.

A further object of my invention is to provide a plug-in light source and reflector system for a slide projector which can be used in lieu of the conventional light source, lamp house, condenser lenses and mechanical cooling system.

Further objects and advantages of my invention will appear upon a study of the following description and of the appended drawings, in which:

FIGURE 1 is a schematic diagram of an off-axis ellipsoidal reflector illuminating system for lantern slide projection, to illustrate the fundamental optical principles involved, the reflector being shown by a full line and the balance of the ellipse by a broken line;

FIGURE 2 is a diagrammatic view of a lantern slide projector illuminating system arranged according to my invention;

FIGURE 3 is a schematic diagram of an off-axis ellipsoidal reflector illuminating system for lantern slide projection including certain additional features of my invention for augmenting the light flux utilization and for increasing the uniformity of illumination;

FIGURES 4, 5 and 6 are a series of diagrams of the lamp coil images formed at the second focus of the ellipsoidal reflector, under various conditions, as will appear below;

FIGURE 7 is a view, in side elevation, of an integral beam slide projector lamp projection system according to my invention;

FIGURE 8 is a horizontal section through the plane 8—8 of FIGURE 7 showing the relationship of the several elements of the optical system;

FIGURE 9 is a view, in side elevation, of another form of integral beam slide projector according to my invention;

FIGURE 10 is a view, in front elevation, of the lamp shown in FIGURE 9;

FIGURE 11 is a horizontal section through the plane 11—11 of FIGURE 9 showing the optical relationship of the several elements of the system;

FIGURE 12 is a top plan view of another form of lamp construction;

FIGURE 13 is a view, in front elevation, of the lamp shown in FIGURE 12; and

FIGURE 14 is a view, in side elevation, of the lamp shown in FIGURE 12.

Referring now to FIGURE 1 of the drawings, I have shown a greatly simplified optical diagram of a lantern slide projection system, including a frame 10 providing a slide aperture 11, a simple projection lens 12, a reflector 13, and an incandescent lamp 14. The reflector 13 is a part of an ellipsoid and is shown by a solid line, the balance in the plane of the drawing being illustrated by a broken line. The slide aperture 11 and the projection lens 12 are disposed upon the lines $af_2$ and $bf_2$, $f_2$ being located at the center of the lens 12 which is one of the foci of the ellipsoid. Corresponding rays from the lamp filaments or vertical coils 15—15 to the reflector 13 are indicated at $f_1a$ and $f_1b$, $f_1$ being located at the center of the vertical coils 15—15 which is the other focus of the ellipsoid. The image of the light source coils 15—15 formed at $f_2$ in the projection lens 12, will be magnified differently along the several rays. For example, the magnification due to reflection at point "$a$" will be only $$\frac{af_2}{f_1a}$$

while at point "$b$" it will be $$\frac{bf_2}{f_1b}$$

For a constant source size, the several image sizes resulting would tend to fill the projection lens 12 unequally. This would be manifested as uneven screen illumination.

The relative magnifications are illustrated in FIGURE 4 where small lamp filament images 16—16, formed by reflection at point "$a$," fail to fill the projection lens 12, but large filament images 17—17, formed by reflection at "$b$," overfill the projection lens 12. I have discovered that this condition can be mitigated by proper orientation of the lamp filaments or coils 15, as well as by proper disposition thereof to minimize the disparity between the magnification at different aspects. The means employed to do this will become apparent from reconsideration of FIGURE 1. The major axis W—Z of the elliptical reflector 13 is located so that the light source provided by the filaments or coils 15—15 is outside of the lower marginal ray $bf_2$ from the reflector 13 through the aperture 11 to the projection lens 12 with the result that there is no imaging of the source on the screen. There will then be, in general, a light path $f_1af_2$ such that the magnification along it will be a maximum. In other words, $$\frac{af_2}{f_1a}$$

will be a maximum. This condition exists when the light path $f_1a$ is at right angles to W—Z, the reflector axis. Of all the possible positions of the light source, the one closest to the projection lens 12 is also the one leading to the most economical reflector configurations. Accordingly, I prefer to establish a reflector and lamp combination in which these two principles for optimizing the magnification ratios of the reflector 13 are employed in combination with certain other expedients.

Referring now to FIGURE 2, I have illustrated a lantern slide system including the frame 10 providing the slide aperture 11, projection lenses 12—12, the ellipsoidal reflector 13, and a lamp 20. The lamp filaments or coils 21 in this case are disposed horizontally rather than vertically for I have discovered that this results in much better uniformity of illumination and freedom from shadows or banding. The lamp coils 21 further are disposed more or less broadside to the point of lowest magnification, but edgewise toward the point of greatest magnification, thus equalizing the effect of the disparate magnifications. It is further to be seen from inspection of FIGURE 2 that the configuration of the reflector 13 is such as to maximize the magnification ratios and improve filling the projection lenses 12—12 according to the principles disclosed above.

The resulting lamp filament images are shown in FIGURE 5 from which it will be clear that the coil images 22—22, due to reflection at "$a$," are much larger and fill the lens aperture better in proportion to the size of the coil images 23—23, due to reflection at "$b$," than is the case in FIGURE 4. Further to enhance the illumination, I provide a spherical rear reflector 24 which forms an image of the light source provided by the filaments or coils 21 at the source indicated at $f_1$, thus conserving the rearwardly emitted light flux.

Although the projection system shown in FIGURE 2 is much improved through the application of the several principles of my invention, complete uniformity of illumination of the slide aperture 11 still is not provided without the application of additional principles of my invention, some of which are illustrated in FIGURE 3, in which the reference characters refer to similar parts illustrated in the preceding figures. The additional feature disclosed here is a decentered re-reflector or spherical reflector segment 27. The re-reflector or reflector segment 27, unlike reflector 24, is not centered upon the source at $f_1$. Reflector segment 27 instead is centered somewhat to the right of $f_1$, as indicated at point 25, a distance up to half the length of one of the coils 21, thus creating an image 21a of the coils 21 adjacent thereto and appearing as an extension thereof. The decentering of the reflector segment 27 is chosen, as will be evident from below, to enlarge the apparent source size as seen by the elliptical reflector 13. The image 21a is not seen directly by reflector 13, but the light flux therefrom is gathered by the rear reflector 24 centered on the coils 21 and refocused as an image 21b adjacent to the opposite end of coils 21, as indicated by line 26. The elliptical reflector 13 sees this image 21b as a prolongation of the coils 21 so that the combined light source length provided by coils 21 plus the image 21b thereof is at least sufficient to fill the projection lens 12. It may now be noted why the source provided by the coils 21 is not shown centered on the first focus "$f_1$" of the elliptical reflector 13 in this embodiment of my invention. Rather, the focus $f_1$ is located at the junction between the coils 21 and the image 21b thereof. The reason for this is that the whole effective source seen by reflector 13 comprising the coils 21 plus the coil image 21b is more nearly centered on the focus $f_1$. This is illustrated in FIGURE 6 where the source images in the projection lens 12 and "$f_2$" due to reflection at points "$a$" and "$b$" are indicated, respectively, at 28—28 and 29—29, the broken line portions 30—30 of the image denoting that portion due to the source image 21b. It is apparent that the projection lens 12 is more adequately and more uniformly filled, as shown in FIGURE 6, than as shown in FIGURE 5. The reason for this is that the coil images reflected at "$a$" are now long enough to completely fill the lens 12, but the coil images reflected at "$b$" are not large enough to overfill the lens 12 because the limited extent of the decentered reflector segment 27 does not contribute additional light flux in this direction.

I wish to emphasize that the location and focus of the decentered reflector segment 27, utilized according to the principles of my invention, tends to augment the illumination due to the low magnification region, without contributing to the high magnification region of the ellipsoidal reflector 13, thus creating a more uniformly illuminated slide aperture 11. If a reflector segment 27 were centered upon the light source provided by the coils 21, no additional light gain would result because the additional light flux picked up would be reflected back upon itself by the spherical reflector 24, without reaching the ellipsoidal reflector 13. The amount of decentering of the reflector segment 27 in effect controls the region upon elliptical reflector 13 where the additional illumination is to be added.

In a practical embodiment of the invention as illustrated in FIGURE 3, I employ spun aluminum reflectors having specially polished and anodized reflecting surfaces. Both the elliptical reflector 13 and the re-reflector or spherical reflector segment 27 can be spun as a combined surface of revolution around the major axis W—Z, from which a suitable sized segment is taken as required. By way of example, in a typical system for illuminating a 1½ inch square slide aperture 11, I may employ a lamp 20 designated as of 2-cc-8 construction of about 150 watts size, but with the lamp axis placed horizontally. The elliptical reflector 13 is a segment of an ellipsoid of revolution whose foci $f_1$ and $f_2$ may be about 5.200 inches apart and whose corresponding major and minor diameters may be 7.920 inches and 5.974 inches respectively. The spherical re-reflector or reflector segment 27 may have a radius of about 2.497 inches, centered at a point on the axis of W—Z of the ellipsoid about .094 inch from the focal point $f_1$. The spherical reflector 24 may be of any convenient radius sufficient to clear the glass envelope 35 of the lamp 20 and of sufficient extent to encompass the solid angle subtended by reflectors 13 and 27. This illuminating system, appropriately mounted and adjusted, will satisfactorily fill a 4 inch E.F., f/3.5 projection lens 12 through a 1½ x 1½ inch slide aperture 11, to give 300 to 400 screen lumens, depending upon the precise design details and adjustment. In order to provide the equivalent screen illumination using conventional equipment, a much higher wattage source is required with the attendant requirement that the excess heat be dissipated by a blower or other means. When the present invention is employed, the cost, complexity and size of the projector are favorably reduced.

In an improved embodiment of my invention, illustrated in FIGURES 7 and 8, some of the several elements of the projection system illustrated in FIGURE 2 have been included within a common glass lamp envelope or bulb shown, generally, at 36. An advantage of this arrangement is that optical alignment is established between the lamp coil 21 and the optical elements at the time of manufacture, and is not dependent upon alignment of the reflectors 13 and 24 and the lamp 20 within the projector. A further advantage of this arrangement is that the size of the reflectors 13 and 24 can be reduced to a minimum because they can be brought close to the lamp coil 21 without interference with the usual lamp envelope 35. Much more advantageous optical design is possible because the lamp coil 21 can be brought closer to its optimum position, according to the principles disclosed above. Thus the lamp coil 21 can be placed almost within the line of sight of the projection lens 12 looking through the aperture 11, and it can be placed much closer to the position for maximizing the low magnification region of the reflector.

The construction illustrated in FIGURES 7 and 8 comprises interfitting front and back sections 37 and 38 sealed together along their meeting surfaces to provide the bulb or envelope 36. An integral tubulature 39 is provided at the bottom of the back section 38 through which is sealed in the lamp coil 21 as well as wire stem supports 40 and 41 which support it and the reflector 24. Also wire stem supports 42 and 43 carry the ellipsoidal reflector 13. The wire stem supports 40—41 and 42—43 extend through a conventional base 44 having a depending central key pin 45 for locating and stabilizing purposes in a socket. The entire reflector and coil assembly, shown in FIGURES 7 and 8, can be introduced for sealing into the envelope or bulb 36 and the tubulature 39 by way of a flanged window opening 46 of the back section 38 followed by application of the front section 37. After assembly, the mating flanged glass window or front section 37 is fused over this opening. Then the assembly is ready for evacuation and gas filling, using conventional techniques well known to the art.

In a further improved embodiment of my invention, illustrated in FIGURES 9, 10 and 11, some of the several elements of the projection system illustrated in FIGURE 3 are disposed within a common glass envelope or bulb 50, which serves also to provide the reflector surfaces. The several corresponding sides of this integral beam lamp bulb are blown or pressed to the contour and shape of the separate reflectors 13, 24 and 27, illustrated in FIGURE 3, and metallized by internal vacuum evaporation of aluminum or silver, using techniques well understood in the art. These surfaces are indicated at 13', 24' and 27' and correspond, respectively, to the reflectors 13, 24 and 27. The bulb 50 is provided with a tubulature 51 at the bottom thereof through which is sealed in the lamp coils 21 and wire stem supports 52 and 53 and onto which is affixed a suitable base 54 having a depending central key pin 55. Seen in cross section, in FIGURE 11, the integral beam lamp includes an ellipsoidal reflecting surface 13', a re-reflecting surface 27', and a spherical reflector surface 24'. These surfaces, as well as all other interior surfaces of the bulb 50, are metallized, with the exception of the window area 56. This area is kept clear during the metallizing operation by masking, using well known expedients, such as a layer of sand, for this purpose. The lamp coils 21' may be of similar design to the coils 21 as illustrated in FIGURE 3. The optical principles of the integral beam lamp, shown in FIGURES 9, 10 and 11, are in all respects similar to those described above in connection with FIGURE 3, so that I shall not repeat a description of their mode of operation. If desirable, this integral beam lamp may be modified by the omission of the re-reflector 27', thus creating a lamp analogous to the illuminating system illustrated in FIGURES 2 or 7 and 8. In either case, the advantages of this construction, like those of FIGURES 7 and 8, lie in the accuracy of alignment of the optical elements, the small scale of the optical elements resulting from closer proximity to the lamp coil made possible by the absence of the usual bulb around the coil, and the optimum positioning of the lamp coil in accordance with previously enunciated principles made possible for the same reason. The remaining stages of the lamp making process are again conventional and will not be described in detail herein.

Another integral beam lamp is shown, generally, at 60 in FIGURES 12, 13 and 14. It includes a glass envelope or bulb, shown generally at 61, and having a vertically extending ellipsoidal reflecting surface 13" which corresponds to the reflector 13 of FIGURE 3. Suitably located in accordance with the principles of this invention is a re-reflector surface 27" at the upper end of the surface 13" which corresponds to the re-reflector or reflector segment 27 of FIGURE 3. It will be understood that the surfaces 13" and 27" are metallized as described above for the surfaces 13' and 27'. A filament or coil 21" is mounted on wire stem supports 62 and 63 that extend through a tubulature 64 and are mounted in a base 65 that has a depending central key pin 66. In this embodiment, a reflector 24", corresponding to the reflector 24 of FIGURE 3, is mounted, as shown on the wire stem supports 62 and 63. A generally vertically extending window 67 is located symmetrically of the base 65 and permits the passage of light in the manner previously described.

The several embodiments of my invention described above were by way of example, in order to disclose illustrative practical embodiments thereof, and they are not in any manner intended to limit the scope of the invention except as limited by the following appended claims.

What is claimed as new is:

1. An illuminating system for projectors comprising a projection lens, means providing a film aperture in the focal plane of said lens, an ellipsoidal reflector extending across the field of view of said lens through said aperture, an elongated light source at the first focal point of said reflector, said projection lens being at the second focal point of said reflector and the said light source being located outside the margin of the field of view of said projection lens in a position establishing substantially a right angle between the projection lens and the point of intersection of said reflector with the opposite margin of the field of view as seen from the source position said elongated light source extending generally parallel to the major axis of the ellipsoidal reflector.

2. An illuminating system for projectors comprising a projection lens, means providing a film aperture in the focal plane of said lens, an ellipsoidal reflector extending across the field of view of said lens through said aperture, a light source including an elongated coil at the first focal point of said reflector, the longitudinal axis of said source being disposed parallel to a plane containing the major axis of the ellipsoid passing through the focal points, said projection lens being at the second focal point of said reflector, the first focal point and said source being located outside the margin of the field of view of said projection lens in a position establishing substantially a right angle between the projection lens and the point of intersection of said reflector with the opposite margin of the field of view as seen from the source position.

3. An illuminating system for projectors comprising a projection lens, means providing a film aperture in the focal plane of said lens, an ellipsoidal reflector extending across the field of view of said lens through said aperture, a light source including an elongated coil at the first focal point of said reflector, said projection lens being at the second focal point of said reflector, said first focal point and said source being located outside the margin of the field of view of said projection lens in a position establishing substantially a right angle between said projection lens and the point of intersection of the reflector with the opposite margin of the field of view as seen from the source position, said coil being oriented generally at right angles to the line of sight therefrom towards said intersection point and generally parallel to the major axis of the reflector.

4. An illuminating system for projectors comprising a projection lens, means providing a film aperture in the focal plane of said lens, an ellipsoidal reflector extending across the field of view of said lens through said aperture, a light source including an elongated coil at the first focal point of said reflector, said projection lens being at the second focal point of said reflector, said first focal point and said source being located outside the margin of the field of view of said projection lens, a spherical reflector centered upon said coil opposite said ellipsoidal reflector and encompassing the field of view thereof as seen from said source, and another spherical reflector decentered from said source for collecting additional light flux therefrom to form an image thereof adjacent to said source and contributing additional light flux into the system for augmenting the illumination of the underfilled low magnification region of said system.

5. An illuminating system for projectors comprising a projection lens, means providing a film aperture in the focal plane of said lens, an ellipsoidal reflector extending across the field of view of said lens through said aperture, a lamp including an elongated coil source at the first focal point of said reflector, the longitudinal axis of said coil source being disposed parallel to a plane containing the major axis of the ellipsoid passing through the focal points thereof, said projection lens being at the second focal point of said reflector, said first focal point and said coil source being located outside the margin of the field of view of said projection lens, a spherical reflector centered upon said coil source opposite said ellipsoidal reflector and encompassing the field of view thereof as seen from said coil source, and another spherical reflector decentered from said coil source for collecting additional light flux therefrom to form an image thereof adjacent to said coil source and contributing additional light flux into the system for augmenting the illumination of the underfilled low magnification region of said system.

6. An illuminating system for projectors comprising a projection lens, means providing a film aperture in the focal plane of said lens, an ellipsoidal reflector extending across the field of view of said lens through said aperture, a lamp including an elongated coil source at the first focal point of said reflector, said projection lens being at the second focal point of said reflector, said first focal point and said coil source being located outside the margin of the field of view of said projection lens in a position establishing substantially a right angle between the projection lens and the point of intersection of the reflector with the opposite margin of the field of view as seen from the lamp position, a spherical reflector centered upon said coil source opposite said ellipsoidal reflector and encompassing the field of view thereof as seen from the coil source, and another spherical reflector decentered from said coil source for collecting additional light flux therefrom to form an image thereof adjacent to said coil source and contributing additional light flux into the system for augmenting the illumination of the underfilled low magnification region of said system.

7. An illuminating system for projectors comprising a projection lens, means providing a film aperture in the focal plane of said lens, an ellipsoidal reflector extending across the field of view of said lens through said aperture, a lamp including an elongated coil source at the first focal point of said reflector, the axis of said coil source being disposed parallel to a plane containing the major axis of the ellipsoid passing through the focal points thereof, said projection lens being at the second focal point of said reflector, said first focal point and said coil source being located outside the margin of the field of view of said projection lens in a position establishing substantially a right angle between the projection lens and the point of intersection of the reflector with the opposite margin of the field of view as seen from the lamp position, a spherical reflector centered upon said coil source opposite said ellipsoidal reflector and encompassing the field of view thereof as seen from the coil source, and another spherical reflector decentered from said coil source for collecting additional light flux therefrom to form an image thereof adjacent to said coil source and contributing additional light flux into the system for augmenting the illumination of the underfilled low magnification region of said system.

8. An integral beam lamp for a projection system including an ellipsoidal reflector for illuminating a film aperture in a member in the focal plane of a projection lens located at the second focal point of the ellipsoidal reflector, comprising a lamp bulb, and within said lamp bulb an ellipsoidal reflector extending across the field of view of said lens through said aperture, an elongated lamp coil at the first focal point of said reflector, said first focal point and the lamp coil being located outside the margin of the field of view of said projection lens in a position establishing substantially a right angle between the projection lens and the point of intersection of the reflector with the opposite margin of the field of view as seen from the coil position said coil being in a position parallel to a plane containing the major axis of the reflector.

9. An integral beam lamp for a projection system including an ellipsoidal reflector for illuminating a film aperture in a member in the focal plane of a projection lens located at the second focal point of the ellipsoidal reflector, comprising a lamp bulb, and with said lamp bulb an ellipsoidal reflector extending across the field of view of said lens through said aperture, an elongated lamp coil source at the first focal point of said reflector, the longitudinal axis of said source being disposed parallel to a plane containing the major axis of the ellipsoid passing through said focal points, said first focal point and said lamp coil being located outside the margin of the field of view of said projection lens in a position establishing substantially a right angle between the projection lens and the point of intersection of the reflector with the opposite margin of the field of view as seen from the coil position.

10. An integral beam lamp for a projection system including an ellipsoidal reflector for illuminating a film aperture in a member in the focal pane of a projection lens located at the second focal point of the ellipsoidal reflector, comprising a lamp bulb, and within said lamp bulb an ellipsoidal reflector extending across the field of view of said lens through said aperture, an elongated coil source at the first focal point of said reflector, said first focal point and the lamp coil being located outside the margin of the field of view of said projection lens in a position establishing substantially a right angle between the projection lens and the point of intersection of the reflector with the opposite margin of the field of view as seen from the coil position, said lamp coil being oriented generally at right angles to the line of sight therefrom towards said intersection point and generally parallel to a plane containing the major axis of the ellipsoidal reflector.

11. An integral beam lamp for a projection system including an ellipsoidal reflector for illuminating a film aperture in a member in the focal plane of a projection lens located at the second focal point of the ellipsoidal reflector, comprising a lamp bulb, and within said lamp bulb an ellipsoidal reflector extending across the field of view of said lens through said aperture, an elongated lamp coil source at the first focal point of said reflector, said first focal point and the lamp coil source being located outside the margin of the field of view of said projection lens, a spherical reflector centered upon said coil source opposite said ellipsoidal reflector and encompassing the field of view thereof as seen from the coil source, and another spherical reflector decentered from said coil source for collecting additional light flux therefrom to form an image thereof adjacent thereto and contributing additional light flux into the system for augmenting the illumination of the underfilled low magnification region of said system.

12. An integral beam lamp for a projection system including an ellipsoidal reflector for illuminating a film aperture in a member in the focal plane of a projection lens located at the second focal point of the ellipsoidal reflector, comprising a lamp bulb, and within said lamp bulb an ellipsoidal reflector extending across the field of view of said lens through said aperture, an elongated lamp coil source at the first focal point of said reflector the axis of said coil source being disposed parallel to a plane containing the major axis of the ellipsoid passing through said focal points, said first focal point and the lamp coil source being located outside the margin of the field of view of said projection lens, a spherical reflector centered upon said coil source opposite said ellipsoidal reflector and encompassing the field of view thereof as seen from the coil source, and another spherical reflector decentered from said coil source for collecting additional light flux therefrom to form an image thereof adjacent thereto and contributing additional light flux into the system for augmenting the illumination of the underfilled low magnification region of said system.

13. An integral beam lamp for a projection system including an ellipsoidal reflector for illuminating a film aperture in a member in the focal plane of a projection lens located at the second focal point of the ellipsoidal reflector, comprising a lamp bulb, and within said lamp bulb an ellipsoidal reflector extending across the field of view of said lens through said aperture, an elongated lamp coil source at the first focal point of said reflector, said focal point and the lamp coil source being located outside the margin of the field of view of said projection lens in a position establishing substantially a right angle between the projection lens and the point of intersection of the reflector with the opposite margin of the field of view as seen from the coil position, a spherical reflector centered upon said coil source opposite said ellipsoidal reflector and encompassing the field of view thereof as seen from the coil source, and another spherical reflector decentered from said coil source for collecting additional light flux therefrom to form an image thereof adjacent thereto and contributing additional light flux into the system for augmenting the illumination of the underfilled low magnification region of said system.

14. An integral beam lamp for a projection system including an ellipsoidal reflector for illuminating a film aperture in a member in the focal plane of a projection lens located at the second focal point of the ellipsoidal reflector comprising a lamp bulb, one wall thereof being rendered reflecting and formed in the shape of an ellipsoidal reflector extending across the field of view of said lens through said aperture, and within said bulb an elongated lamp coil at the first focal point of said reflector and generally parallel to a plane containing the major axis of the reflector, said first focal point and the lamp coil being located outside the margin of the field of view of said projection lens in a position establishing substantially a right angle between the projection lens and the point of intersection of the reflector with the opposite margin of the field of view as seen from the coil position.

15. An integral beam lamp for a projection system including an ellipsoidal reflector for illuminating a film aperture in a member in the focal plane of a projection lens located at the second focal point of the ellipsoidal reflector comprising a lamp bulb, one wall thereof being rendered reflecting and in the shape of an ellipsoidal reflector extending across the field of view of said lens through said aperture, an elongated lamp coil source at the first focal point of said reflector, the longitudinal axis of said source being disposed parallel to a plane containing the major axis of the ellipsoid passing through said focal points, said first focal point and the lamp coil source being located outside the margin of the field of view of said projection lens in a position establishing substantially a right angle between the projection lens and the point of intersection of the reflector with the opposite margin of the field of view as seen from the coil position.

16. An integral beam lamp for a projection system including an ellipsoidal reflector for illuminating a film aperture in a member in the focal plane of a projection lens located at the second focal point of the ellipsoidal reflector comprising a lamp bulb, one wall thereof being rendered reflecting and formed in the shape of an ellipsoidal reflector extending across the field of view of said lens through said aperture, an elongated lamp coil source at the first focal point of said reflector, said first focal point and the lamp coil source being located outside the margin of the field of view of said projection lens in a position establishing substantially a right angle between the projection lens and the point of intersection of the reflector with the opposite margin of the field of view as seen from the coil position, said lamp coil source being oriented generally at right angles to the line of sight therefrom towards said intersection point and generally parallel to the major axis of the ellipsoidal reflector.

17. An integral beam lamp for a projection system including an ellipsoidal reflector for illuminating a film aperture in a member in the focal plane of a projection lens located at the second focal point of the ellipsoidal reflector comprising a lamp bulb, one wall thereof being rendered reflecting and formed in the shape of an ellipsoidal reflector extending across the field of view of said lens through said aperture, an elongated lamp coil source at the first focal point of said reflector, said first focal point and the lamp coil source being located outside the margin of the field of view of said projection lens, a second wall of the lamp bulb being rendered reflecting and formed in the shape of a spherical reflector centered upon said coil source opposite said ellipsoidal reflector and encompassing the field of view thereof as seen from the coil source, and a third wall of said bulb being rendered reflecting and formed in the shape of a spherical reflector decentered from said coil source for collecting additional light flux therefrom to form an image thereof adjacent to said coil source and contributing additional light flux into the system for augmenting the illumination of the underfilled low magnification region of said system.

18. An integral beam lamp for a projection system including an ellipsoidal reflector for illuminating a film aperture in a member in the focal plane of a projection lens located at the second focal point of the ellipsoidal reflector comprising a lamp bulb, one wall thereof being rendered reflecting and formed in the shape of an ellipsoidal reflector extending across the field of view of said lens through said aperture, an elongated lamp coil source at the longitudinal first focal point of said reflector the axis of said coil source being disposed parallel to a plane containing the major axis of the ellipsoid passing through said focal points, said first focal point and the lamp coil source being located outside the margin of the field of view of said projection lens, a second wall of the lamp bulb being rendered reflecting and formed in the shape of a spherical reflector centered upon said coil source opposite said ellipsoidal reflector and encompassing the field of view thereof as seen from the coil source, and a third wall of said bulb being rendered reflecting and formed in the shape of a spherical reflector decentered from said coil source for collecting additional light flux therefrom to form an image thereof adjacent to said coil source and contributing additional light flux into the system for augmenting the illumination of the underfilled low magnification region of said system.

19. An integral beam lamp for projection systems of the class utilizing an ellipsoidal reflector for illuminating a film aperture in the focal plane of a projection lens located at the second focal point of the ellipsoidal reflector comprising a lamp bulb, one wall thereof being rendered reflecting and formed in the shape of an ellipsoidal reflector extending across the field of view of said lens through said aperture, an elongated lamp coil source at the first focal point of said reflector, said first focal point and the lamp coil source being located outside the margin of the field of view of said projection lens in a position establishing substantially a right angle between the projection lens and the point of intersection of the reflector with the opposite margin of the field of view as seen from the coil position, a second wall of the lamp bulb being rendered reflecting and formed in the shape of a spherical reflector centered upon said coil source opposite said ellipsoidal reflector and encompassing the field of view thereof as seen from the coil source, and a third wall of said bulb being rendered reflecting and formed in the shape of a spherical reflector decentered from said coil source for collecting additional light flux therefrom to form an image thereof adjacent said coil source and contributing additional light flux into the system for augmenting the illumination of the underfilled low magnification region of said system.

20. In a projector including an objective having an optical axis and aperture means located along the optical axis at the focal plane thereof, the improved light source comprising an elongated lamp coil extending out of the field of view of the objective, an ellipsoidal reflector forming a portion of an ellipsoid having a major axis extending angularly relative to and intersecting the optical axis and also extending substantially coaxially with the lamp coil, the ellipsoid having a near focal point near the reflector at the lamp coil and a remote focal point at the point of intersection of the major axis and the optical axis, the reflector being positioned predominantly to one side of the major axis and predominantly behind the near focal point, and a second reflector positioned predominantly on the other side of the major axis and focused on the coil.

21. In an integral beam lamp including a multi-pin base and a bulb sealed to the base, an elongated lamp coil mounted on a pair of the pins of the base, and an ellipsoidal reflector in the bulb in a position having the major axis and near focal point of the ellipsoid thereof intersecting the lamp coil, the lamp coil and the major axis being substantially coaxial relative to one another.

22. The integral beam lamp of claim 21 and including a second reflector in the bulb in a position at one side of the major axis and focused on the lamp coil.

23. The integral beam lamp of claim 21 and including a spherical reflector in the bulb in a position at one side of the major axis and focused on a point on the major axis in the vicinity of the coil and spaced from the midpoint of the coil to form an image of the coil at a position spaced longitudinally from the coil.

24. An incandescent electric projection lamp comprising a sealed envelope, an ellipsoidal reflector sealed within said envelope and consisting of a portion of an ellipsoid unsymmetrical to the axis of the ellipsoid and having a first focal point within the envelope and a second focal point outside of the envelope, and an incandescent filament at said first focal point.

25. An incandescent electric projection lamp according to claim 24 and including a light directing baffle in close proximity to the said incandescent filament and placed on the side of the filament remote from said reflector.

26. An incandescent electric projection lamp having a longitudinal axis and a light projection axis at right angles to the longitudinal axis, and comprising a sealed envelope of vitreous material, an ellipsoidal reflector sealed within said envelope and consisting of a portion of an ellipsoid unsymmetrical to the axis of the ellipsoid and having a first focal point within the envelope on the longitudinal axis of the lamp and a second focal point outside of the lamp envelope on the light projection axis of the lamp, and an incandescent filament at the said first focal point.

27. An incandescent electric projection lamp according to claim 26 and including a light directing baffle in close proximity to the said incandescent filament placed on the side of the filament remote from the said reflector.

28. An incandescent electric projection lamp arranged with its longitudinal axis at an angle to its light projection axis comprising a sealed envelope of vitreous material, an ellipsoidal reflector within said envelope comprising a portion of an ellipsoid unsymmetrical to the axis of the ellipsoid with the axis of the ellipsoid extending as a line between the longitudinal and light projection axes of the lamp and with a first focal point within the envelope on the longitudinal axis of the lamp and a second focal point outside of the envelope on the light projection axis of the lamp, and an incandescent filament at the said first focal point.

29. In a projection lamp including a base and an envelope sealed to the base, a reflector forming a portion of an ellipsoid on one side of the major axis of the ellipsoid, the ellipsoid having a first focal point in the envelope and a second focal point outside of the envelope, and incandescent filament means lying in a plane generally facing ellipsoidal reflector, said plane also extending generally along said major axis, the portion of said plane occupied by the filament means also including said first focal point in the central portion thereof.

30. The projection lamp of claim 29 wherein the filament means comprises a pair of elongated helical filaments bracketing said first focal point.

31. The projection lamp of claim 29 wherein the filament means comprises an elongated helical filament extending substantially along said major axis of said ellipsoid.

References Cited in the file of this patent

UNITED STATES PATENTS

| | | |
|---|---|---|
| 1,763,630 | Hopkins | June 10, 1930 |
| 1,948,516 | De Vault | Feb. 27, 1934 |
| 2,059,033 | Rivier | Oct. 27, 1936 |
| 2,131,852 | Brackett | Oct. 4, 1938 |

FOREIGN PATENTS

| | | |
|---|---|---|
| 412,579 | Great Britain | June 28, 1934 |
| 455,476 | Great Britain | Oct. 31, 1936 |